Nov. 20, 1956  L. H. LEONARD, JR  2,770,953
CONTROL ARRANGEMENTS FOR ABSORPTION REFRIGERATION SYSTEMS
Filed April 8, 1955  3 Sheets-Sheet 1

INVENTOR.
Louis Howell Leonard Jr.
BY Herman Seid
Atty.

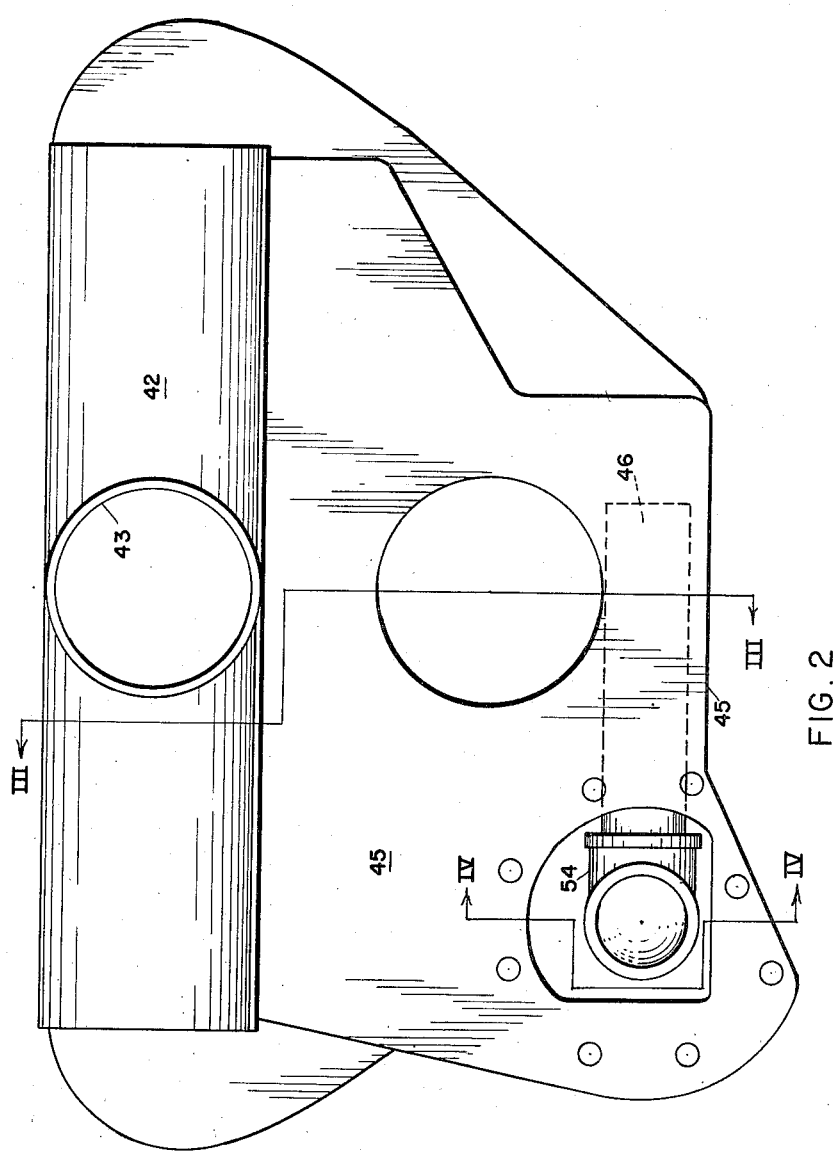

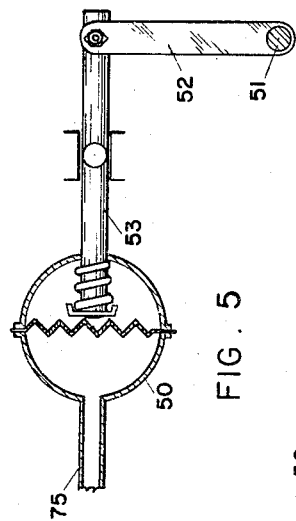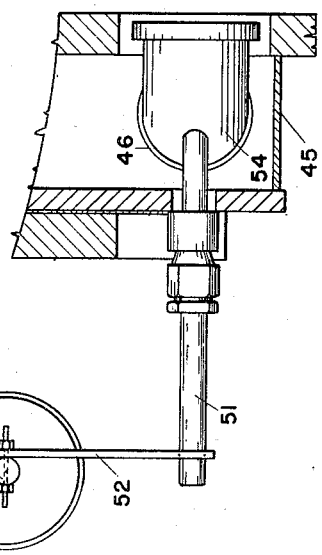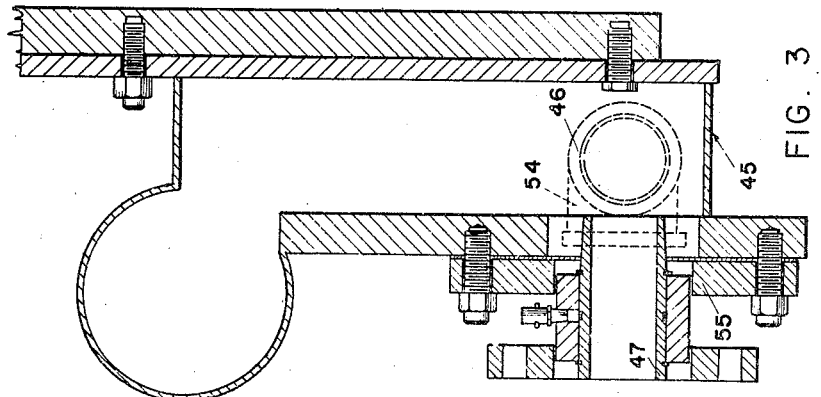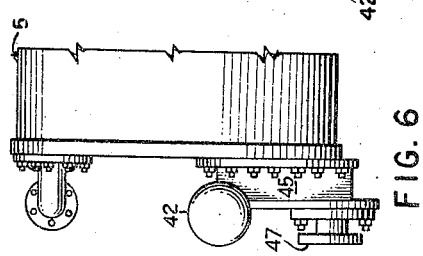

United States Patent Office 2,770,953
Patented Nov. 20, 1956

2,770,953

CONTROL ARRANGEMENTS FOR ABSORPTION REFRIGERATION SYSTEMS

Louis Howell Leonard, Jr., East Syracuse, N. Y., assignor to Carrier Corporation, Syracuse, N. Y., a corporation of Delaware Application April 8, 1955, Serial No. 500,140

13 Claims. (Cl. 62—5)

This invention relates to an absorption refrigeration system and, more particularly, to an absorption refrigeration system including water as a refrigerant and a solution of lithium bromide in water as an absorbent which includes an improved control arrangement for regulating the capacity of the machine and the concentration of solution leaving the generator.

In my co-pending application Serial No. 240,645, filed August 7, 1951, entitled "Control Arrangement for Absorption Refrigeration Systems," now Patent No. 2,722,-805, granted November 8, 1955, there is disclosed and claimed a control arrangement for regulating the capacity of the machine and the concentration of strong solution leaving the generator. This control arrangement is highly satisfactory in use. However, in certain localities scaling problems are encountered so that it is necessary to employ water treatment for the condensing water employed in the absorption refrigeration system. When the condensing water is chemically treated, ordinarily, such treatment adequately compensates for any increase in scaling tendencies due to high condensing temperatures encountered at partial load. It will be appreciated that water treatment is expensive so that it is desirable that such treatment be eliminated so far as possible in all applications of absorption refrigeration machines.

I have found that scaling problems at partial load operation may be minimized if full flow of condensing water through the condenser is maintained under all load conditions. Full flow results in lower condensing temperatures at partial load conditions and also maintains a high velocity of condensing water through the tubes of the condenser which is an important factor in reducing scaling tendencies. It is desirable too that solution temperature leaving the generator be reduced at partial load operation to minimize scaling problems in the absorber and to improve the steam rate at partial load operation. It is also desirable that the absorption refrigeration machine secure the advantage of lower entering condensing temperatures at partial loads.

The chief object of the present invention is to provide an absorption refrigeration system embodying an improved control arrangement which minimizes scaling problems encountered during partial load operation of the system in those situations in which water treatment is not employed for condensing water.

An object of the present invention is to provide an absorption refrigeration system employing water as a refrigerant and a solution of lithium bromide and water as an absorbent which embodies an economical control arrangement for regulating the capacity of the machine and the concentration of strong solution leaving the generator.

A further object is to provide an absorption refrigeration system in which a plurality of the generator tubes are rendered ineffective for extracting latent heat from the steam or to condense steam in response to a change in load imposed upon the system as indicated by a change in the temperature of chilled water leaving the evaporator.

Other objects of the invention will be readily perceived from the following description.

The invention relates to an absorption refrigeration system which includes an absorber, an evaporator, a generator and a condenser. The absorber and evaporator preferably are disposed in a shell. If desired the generator and condenser may be disposed in a second shell which may be placed above the first shell. The absorber and the generator are connected to permit flow of strong solution from the generator to the absorber and flow of weak solution from the absorber to the generator. The condenser serves to condense refrigerant vapor boiled off in the generator, the condensate being returned to the evaporator where it is flash cooled, the flashed vapor passing to the absorber to be absorbed by solution therein. Condensing water is passed through the absorber and the condenser.

Steam is supplied to the generator, the steam being condensed in the generator by being placed in heat exchange relation with solution therein. Means are provided to render a plurality of the generator tubes ineffective for extracting latent heat from the steam by filling the tubes with steam condensate; such means include an adjustable or movable weir placed in the steam chest and a suitable motor such as a pneumatic motor for actuating the weir. A thermostatic control is provided which is responsive to the temperature of vapor condensate leaving the condenser and serves to regulate supply of compressed air to the pneumatic motor which operates the weir.

This invention further relates to a method of operation of an absorption refrigeration system including an absorber, an evaporator, a condenser and a generator containing tubes to which steam or similar vapor is supplied in heat exchange relation with solution exteriorly of the tubes, in which the steps consist in circulating solution between the absorber and the generator and between the generator and the absorber, supplying steam or similar vapor to the generator in heat exchange relation with solution therein, and regulating the capacity of the system by rendering at least a number of the tubes ineffective to extract latent heat from the steam.

The attached drawings illustrate a preferred embodiment of the invention, in which—

Figure 2 is a view in elevation of one end of the generator illustrating the steam chest applied thereto;

Figure 3 is a sectional view taken on the line III—III of Figure 2;

Figure 4 is a sectional view taken on the line IV—IV of Figure 2;

Figure 5 is a diagrammatic view illustrating the pneumatic motor for actuating the adjustable weir; and Figure 6 is a fragmentary view in side elevation of the generator condenser shell embodying the present invention.

Figure 1:
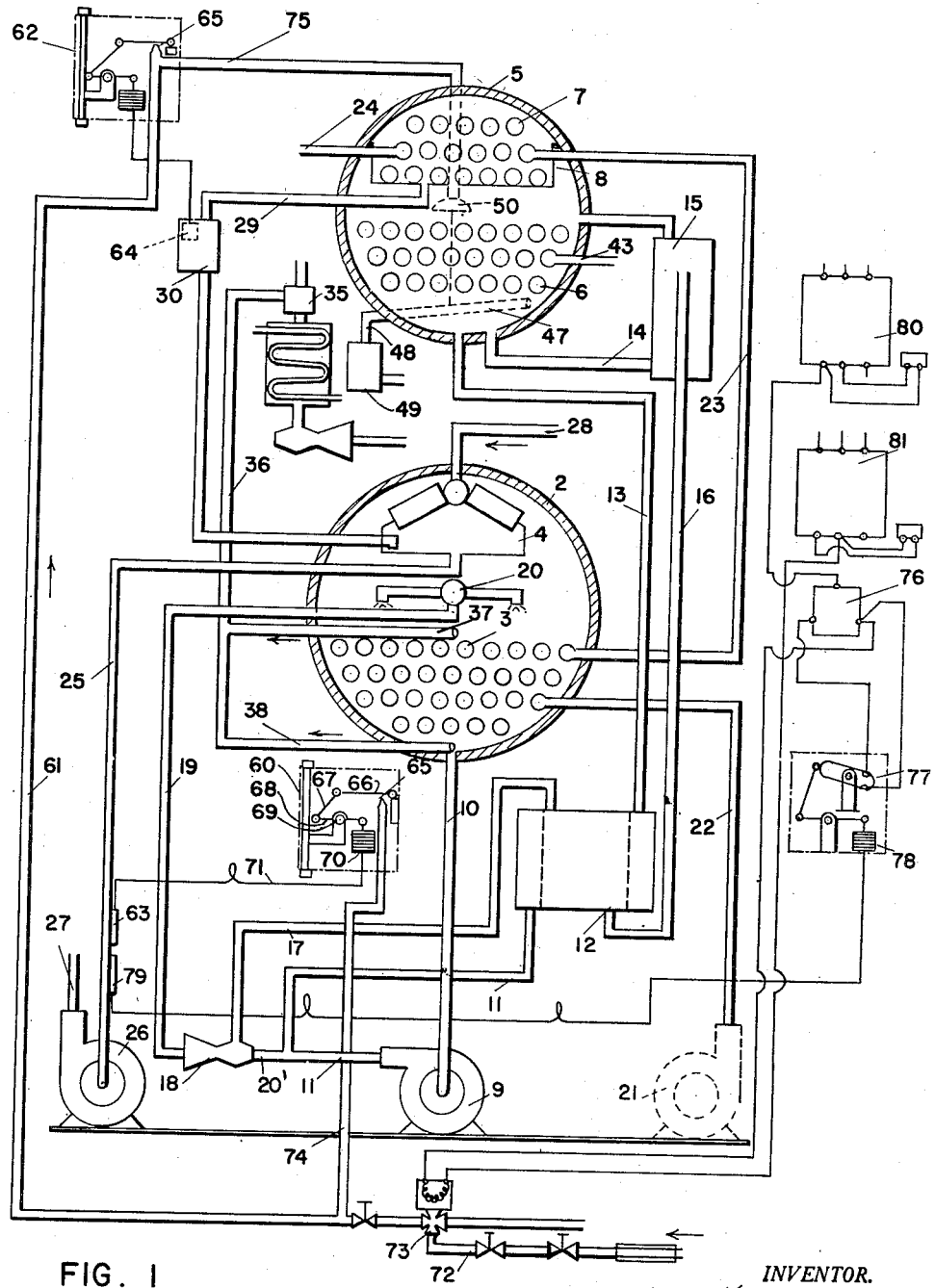
Figure 1 is a diagrammatic view of an absorption refrigeration system embodying the control arrangement of the present invention.

Referring to the attached drawings, there is illustrated an absorption refrigeration system embodying the control arrangement of the present invention. The system comprises a shell 2 containing a plurality of tubes 3 which cooperate with the shell to form an absorber. Placed in shell 2 above absorber 3 is a pan-like member 4 which cooperates with shell 2 to form an evaporator. A second shell 5, preferably, is placed above the first shell. Tubes 6 extend in the lower portion of shell 5 and cooperate with shell 5 to form a generator. A plurality of tubes 7 are placed in the upper portion of shell 5 to form a condenser. Tubes 7 cooperate with a pan-like member 8 and with the shell to form the condenser.

A pump 9 withdraws weak solution from absorber 3 through line 10. Pump 9 forwards the weak solution through line 11, heat exchanger 12 and line 13 to generator 6. Strong solution is withdrawn from generator 6 through line 14 to an overflow arrangement 15 which maintains a desired level of solution in generator 6. From overflow arrangement 15, the strong solution flows through line 16, heat exchanger 12 and line 17 to an ejector 18 which forwards the strong solution through line 19 to spray arrangement 20 which sprays the strong solution over the tubes of absorber 3. Pump 9 forwards a portion of weak solution through line 11 and line 20 to ejector 18. Discharge of the weak solution in ejector 18 serves to induce strong solution from line 17 into the ejector and to forward the mixture of strong and weak solutions to the spray arrangement 20. It will be appreciated that pump 9 maintains a substantially constant flow of solution through the system.

Pump 21 supplies condensing water through line 22 to the tubes 3 of the absorber. The condensing water after passage through tubes 3 passes through line 23 to the tubes 7 of the condenser. The condensing water after passage through the tubes of the condenser is discharged to a cooling tower or drain through line 24.

Chilled water is withdrawn from evaporator 4 through line 25 by pump 26 and is circulated to a place of use which may be the central station of an air conditioning system through line 27. The chilled water is returned to the evaporator 4 through line 28 and is flash cooled in the evaporator, the flashed vapor passing to the absorber about the exterior of the evaporator.

Condensate leaves condenser 7 through line 29 and is returned to the evaporator, the flashed vapor passing to the absorber 3, as previously described. A bottle 30 is included in line 29 for a purpose hereinafter described. It will be appreciated line 29 is sized to maintain the desired pressure differential between condenser 7 and evaporator 4 and to pass a small amount of vapor and non-condensables from the condenser to the evaporator as well as to return vapor condensate.

A suitable purge arrangement 35 is provided to remove non-condensable gases from absorber 3. Purge 35 is connected to the absorber by line 36 which is connected to purge lines 37, 38 extending longitudinally of the absorber.

As shown in Figures 1 and 6, steam is introduced to the tubes of generator 6 through header 42 connected to steam supply line 43. Preferably, an air vent (not shown) is provided in the top of header 42; such vent may be thermostatically controlled, if desired. If desired, a pressure regulating valve (not shown) may be placed in steam line 43 to regulate the pressure of steam supplied to the generator tubes to a constant inlet pressure. Such valve is ordinarily not necessary when low pressure steam is employed; its use is optional when high pressure steam is employed. It is desirable that the inlet steam line, in the embodiment described header 42, be placed a few inches higher than the top row of tubes in the generator. If it be placed on the same level, when the tubes are filled with condensate, part of the steam line would also be filled with condensate resulting in water hammer and extreme instability.

Steam condensate leaves the tubes of generator 6 and collects in the bottom of steam chest 45. A movable pipe-like member 46 which functions as an adjustable weir is placed in steam chest 45. Weir 46 is connected to a sleeve 47 by an elbow 54 which in turn is connected to a drain line 48 in which a steam trap 49 is provided to assure that only condensate leaves the steam chest.

Weir 46 extends in the steam chest below the openings of the tubes 6 of the generator; thus, in normal operating position at full load, steam condensate collects in the bottom of the steam chest and is free to leave the steam chest through weir 46, sleeve 47 and drain line 48. However, depending upon the load imposed upon the system, movable weir 46 may be raised, thus raising the level of condensate in the steam chest. As the level of condensate in the steam chest increases some of the tubes of the generator are filled with condensate thus rendering such tubes ineffective to extract latent heat from the steam by heat exchange with the solution exteriorly of the tubes. However, such tubes function similarly to a steam economizer for the weak solution entering the generator flows around these tubes, cooling the condensate and preheating the weak solution. Thus at partial load operation, additional heat is recovered from the steam by subcooling the steam condensate. That is, at partial load operation, a small amount of sensible heat is recovered from the steam condensate thereby reducing the amount of steam required to operate the machine at partial load.

Movement of the weir 46 is regulated by means of a pneumatic motor 50 connected to weir 46 by rod 51. Rod 51 in turn is connected to a crank 52. Crank 52 is connected to the shaft 53 of the pneumatic motor 50. Pneumatic motor 50 is actuated as hereinafter described. It will be understood other types of motors may be used, if desired.

If desired, an accelerating type linkage (not shown) may be provided between motor 50 and the actual level of the weir.

Weir 46 is connected to an elbow 54 which is secured to sleeve 47. Sleeve 47 extends through the outer wall of steam chest 45 and is mounted in a plate 55 secured to the outer wall of the steam chest. The exterior wall of sleeve 47 is surrounded by an O-ring or other suitable gasket to assure that leakage of steam from the chest is not permitted.

The adjustable weir condensate drain may be oversized, if desired, to handle large volumes of steam condensate encountered at start-up. That is, condensate level is maintained by an overflow standpipe in effect which is not affected to any extent by large changes in the amount of steam condensate drained.

A thermostatic control 60 serves to regulate the pressure of air passing through branch line 61 to a second thermostatic control 62. Thermostatic control 62 in turn regulates the air pressure applied to motor 50. Thermostatic control 60 is actuated by means of a bulb 63 placed adjacent chilled water line 25. Bulb 63 reflects the temperature of chilled water which in turn indicates the load imposed upon the system. Control 62 is actuated by bulb 64 which reflects saturation temperature corresponding to pressure in shell 5. Bulb 64 preferably is placed in bottle 30 in the condensate line 29 connecting the condenser and the evaporator.

Control 62, in those cases where temperature of the condensing water supplied to the system is not controlled to a specific point, tends to prevent solidification of the solution at full load if the condensing temperature tends to decrease substantially. At partial load, the control arrangement tends to prevent or to minimize solidification due to the fact that the cycle operates at lower overall solution concentrations. Control 62 serves the same purpose at full load operation.

Thermostats 60 and 62 are similar in design. Each includes a vent 65 adapted to be closed by a flapper 66 which is supported by a lever 67 connected to an arm 68 pivoted at 69. Referring to thermostat 60 the opposite end of arm 68 is connected to a bellows 70 which forms a portion of the thermal responsive system including bulb 63, being connected to bulb 63 by capillary 71. Pressure is supplied to the controls through main air line 72. Preferably a solenoid valve 73 or relay of suitable design is placed therein as a safety control, as hereinafter described. Air pressure passes from line 72 to line 61, control 60 being connected to line 61 by branch line 74; thus, pressure in branch line 61 may be regulated by control 60 venting a portion of air therein to the atmosphere in accordance with the temperature of chilled water.

Control 62 has air pressure applied therein through line 61 and vents the air to the atmosphere through vent 65, as determined by saturation temperature corresponding to pressure in shell 5. Branch line 61 is also connected to motor 50 by line 75. Controls 60 and 62 regulate the air pressure applied to the diaphragm of motor 50.

A rotary switch 76 is provided which is connected to a mercury switch 77. Mercury switch 77 may be actuated by means of a bellows 78 and a bulb 79 placed adjacent to chilled water line. Mercury switch 77 serves in effect as a safety control; an increase in temperature of chilled water above a pre-determined point opens the switch thereby closing solenoid valve 73 to prevent supply of air to thermostats 60 and 62 and motor 50. The starters 80 and 81 actuate the motors (not shown) of the solution pump 9 and chilled water pump 26. The starter for the condensing water pump 21 is not shown since such pump and motor are generally provided by the installer.

The term "weak solution" is used herein to describe a solution weak in absorbing power. The term "strong solution" is used herein to define a solution strong in absorbing power.

The preferred absorbing solution is a solution of lithium bromide in water. The preferred refrigerant is water. With such solution, the maximum allowable solution concentration leaving the generator is 66%. A greater concentration may permit crystallization to occur causing solidification in the heat exchanger and in other portions of the system.

Leaving chilled water temperature is determined by the concentration and temperature of solution entering and leaving the absorber. The concentration of solution entering the absorber is determined by the concentration of solution leaving the generator when mixed with the impelling flow from the ejector at the concentration of solution leaving the absorber.

In the present invention capacity control is obtained by regulating the effectiveness of the generator to do work. As previously described such control is attained by regulating the effectiveness of the tube bundle to extract latent heat from the steam; that is, control is attained by filling certain of the tubes of the tube bundle with steam condensate thus rendering such tubes ineffective to extract latent heat from the steam by placing the steam in heat exchange relation with the solution surrounding the exterior of the tubes.

While I have disclosed a steam chest at one end of the generator, it will be understood if desired a steam chest may be provided at each end of the generator so that steam may enter the tubes of the generator from one steam chest, condensate leaving the tubes of the generator and entering the leaving steam chest. If steam chests are employed at opposite ends of the generator, pressure in the chests should be equalized by means of a suitable equalizing line connecting the chests.

For a more complete description of the pneumatic controls reference is made to my co-pending application Serial No. 240,645, filed August 7, 1951, now Patent No. 2,722,805, granted November 8, 1955.

Considering operation of the system, weak solution is withdrawn from absorber 3 through line 10 by pump 9. Weak solution is forwarded to generator 6 through line 11, passing through heat exchanger 12 in heat exchange relation with strong solution returning to the absorber. In the generator, the solution is placed in heat exchange relation with steam in the tubes thereof, refrigerant being boiled off and passing to the condenser 7. The quantity of refrigerant boiled off, of course, is determined by the number of tubes rendered ineffective to extract latent heat from the steam as described above. The strong solution leaves the generator through line 14, overflow arrangement 15, line 16, heat exchanger 12 and line 17 to the ejector 18. A mixture of strong and weak solution is forwarded to the sprays 20 of absorber 3 being sprayed over the tubes therein. Vapor boiled off in the generator passes to condenser 7 where it is condensed by being placed in heat exchange relation with condensing water passing through the tubes of the condenser. The vapor condensate passes to evaporator 4 through line 29. The flashed vapor passes downward about the evaporator 4 to the absorber 3 where it is absorbed by solution therein.

Chilled water leaves the evaporator 4 through line 25 and is forwarded to a place of use through line 27 by pump 26. The chilled water returns to the evaporator 4 from the place of use through line 28 and is sprayed in the evaporator being flash cooled therein.

The capacity of the system is controlled by means of the adjustable weir 46 which determines the level of steam condensate in chest 45. The capacity of the system is regulated in response to the load imposed upon the system as indicated by the temperature of chilled water leaving evaporator 4.

Compressed air pressure is applied to controls 60 and 62 through main air line 72 and branch lines 61 and 74. Control 60 serves to vary the pressure in line 61 in accordance with variations in temperature of chilled water leaving the evaporator which reflects the load upon the system. Thermostat 62 in response to variation in saturation temperature corresponding to pressure in shell 5 varies the air pressure imposed upon motor 50 which regulates movement of weir 46, thus regulating the level of steam condensate in steam chest 45.

At full load both controls 60 and 62 are effective to actuate motor 50 which in turn moves weir 46 to determine the number of tubes in the generator which are rendered ineffective to extract latent heat from the steam. At partial loads, motor 50 is actuated to raise weir 46 thus rendering certain of the generator tubes ineffective since they are filled with condensate thus limiting the ability of the generator to perform work. By limiting the work performed in the generator, the ability of the absorber to perform work is reduced, in turn reducing the ability of the evaporator to perform work.

The system efficiency is improved at partial loads because the machine operates at lower solution temperatures in the generator, requiring less preheating in the solution heat exchanger and heating of solution in the generator. The filled generator tubes extract more heat from the steam condensate than if the steam were merely condensed at the saturation pressure and then drained directly to the steam trap. The lower condensing temperatures result in better cycle efficiencies; that is, the smaller the spread between the evaporating temperature and the condensing temperature, the better the machine efficiency.

The present invention provides a simple effective control arrangement for an absorption refrigeration machine which minimizes scaling problems and improves the operating efficiency of the system at partial loads. The effective amount of heat transfer surface in the generator is controlled so that it is not necessary to control the volume of condensing water passing through the condenser. Thus, the volume of condensing water flowing through the condenser can be maintained constant under all load conditions which results in lower condensing temperatures at partial load operation and keeps condensing water velocity through the tubes high, an important factor in reducing scaling tendencies.

The control provided by the present invention permits a reduction in solution temperature leaving the generator at partial load operation which minimizes scaling problems in the absorber and improves the steam rate at partial load operation thus reducing the overall heat rejection to the cooling tower. The system takes advantage of lower entering condensing water temperatures at partial loads.

The present invention provides a control system which permits satisfactory control of an absorption refrigeration machine during operation at full and partial loads. The control arrangement provided permits the machine to be operated over a range of capacity from 100% to zero capacity.

While I have described a preferred embodiment of the invention it will be understood the invention is not limited thereto since it may be otherwise embodied within the scope of the following claims.

I claim:

1. In an absorption refrigeration system, the combination of an absorber, an evaporator, a generator and a condenser, said generator including tubes to which steam or other vapor is supplied in heat exchange relation with solution exteriorly of the tubes, and means for rendering at least a number of the tubes ineffective to extract latent heat from the steam responsive to a change in load imposed upon the system.

2. In an absorption refrigeration system, the combination of an absorber, an evaporator, a generator and a condenser, said generator including tubes to which steam or similar vapor is supplied in heat exchange relation with solution exteriorly of the tubes, means for rendering at least a number of the tubes ineffective to extract latent heat from the steam, and means responsive to a change in load imposed upon the system to actuate said first means.

3. In an absorption refrigeration system, the combination of an absorber, an evaporator, a generator and a condenser, said generator including at least one steam chest connected to the tubes thereof, steam or similar vapor being supplied to the tubes in heat exchange relation with solution exteriorly of the tubes, means for filling at least a number of the tubes with steam condensate thereby rendering the filled tubes ineffective to extract latent heat from the steam and means responsive to a change in load imposed upon the system for actuating said means.

4. An absorption refrigeration system according to claim 3 in which the first means comprises an adjustable weir member adapted to control the level of steam condensate in the steam chest, said weir being pivoted to be adjusted by said actuating means responsive to a change in load imposed upon the system.

5. An absorption refrigeration system according to claim 4 in which the actuating means include pneumatic means for adjusting said weir.

6. In an absorption refrigeration system, the combination of a first shell including an absorber and an evaporator with the absorber being placed below the evaporator, a second shell containing a generator and a condenser with the generator being placed below the condenser, said generator including a plurality of tubes to which steam or other vapor is supplied in heat exchange relation with solution exteriorly of the tubes, means for filling at least a number of said tubes with steam condensate thereby rendering the filled tubes ineffective to extract latent heat from the steam and means responsive to a change in load imposed upon the system for actuating said first means.

7. An absorption refrigeration system according to claim 6 in which the first means include an adjustable weir member adapted to control the level of steam condensate in the steam chest, said weir being pivoted to be adjusted by said actuating means responsive to a change in load imposed upon the system.

8. An absorption refrigeration machine according to claim 7 in which the actuating means include a pneumatic motor for adjusting said weir.

9. In a method of operation of an absorption refrigeration machine including an absorber, an evaporator, a condenser and a generator containing tubes to which steam or similar vapor is supplied in heat exchange relation with solution exteriorly of the tubes, the steps which consist in circulating solution between the absorber and the generator and between the generator and the absorber, supplying steam or similar vapor to the generator in heat exchange relation with solution therein, and regulating the capacity of the system by rendering at least a number of the tubes ineffective to extract latent heat from the steam.

10. In a method of operation of an absorption refrigeration machine including an absorber, an evaporator, a condenser and a generator containing tubes to which steam or similar vapor is supplied in heat exchange relation with solution exteriorly of the tubes, the steps which consist in circulating solution between the absorber and the generator and between the generator and the absorber, supplying steam to the generator in heat exchange relation with solution therein and controlling the capacity of the system by filling at least a number of the tubes with steam condensate.

11. In a method of operation of an absorption refrigeration machine including an absorber, an evaporator, a condenser and a generator containing tubes to which steam or similar vapor is supplied in heat exchange relation with solution exteriorly of the tubes, the steps which consist in circulating solution between the absorber and the generator and between the generator and the absorber, supplying steam to the generator in heat exchange relation with solution therein and automatically adjusting in response to a change in load imposed upon the system a weir-like member to fill at least a number of the tubes with steam condensate thereby rendering said tubes ineffective to extract latent heat from the steam.

12. In a method of operation of an absorption refrigeration machine including an absorber, an evaporator, a condenser and a generator containing tubes to which steam or similar vapor is applied in heat exchange relation with solution exteriorly of the tubes, the steps which consist in circulating solution between the absorber and the generator and between the generator and the absorber, boiling off vapor in the generator, condensing vapor in the condenser, supplying the condensate to the evaporator, flash cooling condensate in the evaporator, supplying steam or similar vapor to the generator in heat exchange relation with solution therein, and regulating the capacity of the system by rendering at least a number of the tubes ineffective to extract latent heat from the steam responsive to a change in load imposed upon the system.

13. In a method of operation of an absorption refrigeration machine including an absorber, an evaporator, a condenser and a generator containing tubes to which steam or similar vapor is supplied in heat exchange relation with solution exteriorly of the tubes, the steps which consist in circulating solution between the absorber and the generator and between the generator and the absorber, boiling off vapor in the generator, condensing the vapor in the condenser, supplying condensate from the condenser to the evaporator, flash cooling condensate in the evaporator, supplying steam to the generator in heat exchange relation with solution therein and controlling the capacity of the system by filling at least a number of the generator tubes with steam condensate.

References Cited in the file of this patent

UNITED STATES PATENTS

| 447,396 | Worthington | Mar. 3, 1891 |
| 2,061,606 | Zellhoefer | Nov. 24, 1936 |
| 2,349,396 | Andersson | May 23, 1944 |
| 2,469,142 | Andersson | May 3, 1949 |

FOREIGN PATENTS

| 212,014 | Germany | July 19, 1909 |